Nov. 28, 1950

M. M. LEVY 2,531,446

GATED TRIGGER DEMODULATING CIRCUIT

Filed Oct. 6, 1945

INVENTOR
MAURICE M. LEVY
BY R. P. Morris
ATTORNEY

Patented Nov. 28, 1950

2,531,446

UNITED STATES PATENT OFFICE 2,531,446

GATED TRIGGER DEMODULATING CIRCUIT

Maurice Moise Levy, Aldwych, London, England, assignor, by mesne assignments, to International Standard Electric Corporation, New York, N. Y., a corporation of Delaware Application October 6, 1945, Serial No. 620,821
In Great Britain September 1, 1944

Section 1, Public Law 690, August 8, 1946
Patent expires September 1, 1964

2 Claims. (Cl. 250—27)

The present invention relates to multi-channel electrical communication systems utilising distributors.

In systems of the type specified, each channel is allotted its respective portion of a cyclic period during which the channel is made alive and the intelligence of the channel is transmitted, for example as an amplitude modulation of an electrical pulse, or as a time modulation of an electrical pulse, or may be as a combination of both utilising the same pulse for two channels. In the case of time modulated pulses and, may be, in the case of amplitude modulated pulses, there is a time interval between the pulses of the various channels which is substantially constant in the case of amplitude modulated pulses, but varies in the case of the time modulated pulses according to the depth of the time modulation in two successive channels.

Hitherto it has been the practice to apply the pulses to electron discharge amplifier stages, for example for amplification or modulation or demodulation, through a capacity resistance coupling. The pulse applied to the grid of an amplifier stage, however, is not an exact replica of the pulse before passing through the condenser because whenever a pulse appears across the resistance the voltage pulse produces a current and a difference of potential appears across the condenser. The voltage impressed on the grid as a result of a positive voltage pulse passes through zero at the trailing edge of the pulse to a negative voltage amplitude depending upon the amplitude and duration of the pulse applied to the condenser, and the value of the condenser and resistances in the circuit, and will gradually creep back to zero during a time period depending upon the time constant of the condenser-resistance combination, forming a long tail to the pulse.

If this time constant is small, the negative peak will be great and will disappear very quickly; if the time constant is great the negative peak will be small and disappear slowly. In either case, if the successive pulses are sufficiently close the amplitude of the succeeding pulse will be affected by the negative trailing edge of the preceding pulse. In the case of both time-phase and time-duration modulated pulses, the pulse duration or width at a predetermined voltage value is an important factor for demodulation purposes at the receiver. Unless therefore the pulses are rectangular, which is usually not the case, a variation in the amplitude of a pulse varies the width of that pulse at the predetermined voltage value, and hence the variation of the amplitude of one pulse caused by the tail of the preceding pulse introduces cross-talk between adjacent channels. In the case of amplitude modulated pulses, the effect of the tail of the pulses is more evident in changing the amplitudes of the succeeding pulses from their correct values. In the same manner negative pulses applied through a condenser resistance coupling result in a trailing positive peak and tail consequential cross-talk.

The main object of this invention is substantially to reduce or eliminate cross-talk due to the above cause.

This object has been previously attained by utilising a diode or the like, the plate being connected to earth and the cathode to the grid of the electron discharge device to which the pulses are applied so that the negative tail applied to the grid of the device would be substantially cut off. Such an arrangement, however, in a complicated circuit suffers the disadvantage that it requires a large number of diodes, and that it seriously increases the grid to earth capacity.

It has also been proposed to feed the positive pulses to the input of the electron discharge device by a direct current coupling, that is, without the intervention of a condenser. In this case, however, either the cathode resistance of the device must be great enough in order that the proper cathode current may bring the cathode to a suitable positive voltage, or the cathode must be given a high positive potential, for example by means of a suitable resistance potentiometer arrangement. These arrangements usually lead to a value of cathode resistance so great that the amplifying factor of the valve is small.

According to the present invention, there is provided an amplifier for electric pulses comprising a thermionic valve, an input coupling circuit for connecting a source of pulses to the control grid-cathode circuit of the valve, the said coupling circuit including resistance and reactance elements having a time constant of such value as normally to cause interference between succeeding pulses, means for generating grid current in the said valve for suppressing the said interference, means for applying the pulses through the coupling circuit in such sense as to suppress the said grid current, and means for deriving amplified pulses from the output electrode of the said valve.

The invention also provides an amplifier for electric pulses comprising a thermionic valve having a cathode, a control grid and an output electrode, a resistance connected between the control grid and the cathode, means for biassing the control grid positively with respect to the cathode in such manner as to produce a given grid current, a condenser connected to the said control grid, means for applying input pulses in negative sense through the said condenser to the control grid, and means for deriving amplified pulses from the output electrode.

In another form, the invention covers a channel demodulating arrangement for a multi-channel electric pulse communication system comprising two thermionic valves the control grid of each being connected to the anode of the other to form a multivibrator circuit, means for biassing the first valve so that control grid current flows, means for applying time phase modulated pulses in negative sense to the control grid of the first valve through a condenser-resistance coupling circuit, means for biassing the second valve so that it remains cut off during the application of said pulses to the first valve, means for applying rectangular gating pulses corresponding to one of the channels of the system to sensitise the second valve so that it will respond only to the pulses of the said channel, means for deriving time duration modulated pulses from the second valve and means for demodulating the said time duration modulated pulses.

The invention will be described with reference to the accompanying drawing, in which.

Figure 1:
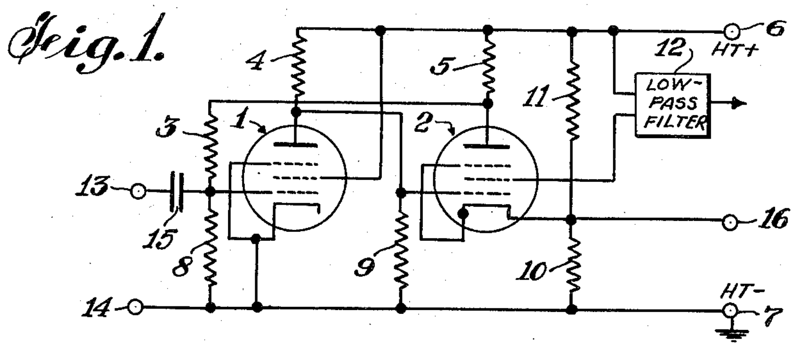
Fig. 1 shows a schematic circuit diagram of one embodiment of the invention.

In the embodiment of the invention shown in Fig. 1, which shows one of the channel demodulators at the receiving end of a muiti-channel time phase modulation pulse system, the two pentode valves 1 and 2 are cross-connected to form a multivibrator circuit. The anode of the valve 1 is connected directly to the control grid of the valve 2, and the anode of the valve 2 is connected to the control grid of the valve 1 through a resistance 3. The anodes of the valves 1 and 2 are connected through anode resistances 4 and 5 to the positive terminal 6 of the high tension source of supply for the valves, the negative terminal 7 being preferably earthed as indicated. The control grids are connected to earth through the resistances 8 and 9 respectively. The cathode of the valve 1 is directly earthed and that of valve 2 is earthed through a resistance 10 and is connected to terminal 6 through a resistance 11. The screen grid of the valve 1 is directly connected to terminal 6 and that of the valve 2 is connected to terminal 6 through the input circuit of a demodulating low pass filter 12. It will be evident that the valve 1 could be a triode or tetrode, if desired.

The incoming time-phase modulated trains of pulses are applied to the circuit between terminals 13 and 14, connected respectively to the control grid of the valve 1 through a condenser 15, and to earth. Rectangular gating pulses are intended to be applied between the terminal 16 connected to the cathode of the valve 2, and terminal 7. The pulse voltage applied to each of the terminals 13 and 16 should be negative with respect to earth.

It will be seen that the control grid of the valve 1 is positively biassed with respect to the cathode, by means of the chain of resistances 5, 3, 8. This valve will therefore be in a conducting condition, and the anode voltage will accordingly be relatively low. There will also be grid current. The cathode of the valve 2 is positively biassed by means of the resistances 10 and 11. When a negative pulse is applied to the control grid of the valve 1, this valve will be cut off and the anode voltage will rise, thus increasing the positive voltage applied to the control grid of the valve 2. The cathode bias of this valve should be adjusted to a sufficiently high positive value that the valve is in a non-conducting condition and does not respond when a negative pulse is applied to terminal 13.

The gating pulses applied negatively at terminal 16 correspond to one of the channels of the system and are timed to occur during the periods of occurrence of the pulses of that channel. When one of these gating pulses arrives, it counteracts the positive bias applied to the cathode of the valve 2 in such manner that while it does not cause the valve to conduct it enables it to respond and become conducting as soon as the corresponding time-phase modulated channel pulse arrives. The anode voltage of the valve 2 falls and maintains the control grid of the valve 1 at a low potential after the disappearance of the original pulse, and the valve 2 remains in the conducting condition until the gating pulse disappears, when the valve 2 is again cut off, and the circuit returns to its original condition.

It will thus be seen that on the arrival of a gating pulse, the circuit is prepared to respond to the arrival of the corresponding time modulated channel pulse. Nothing occurs until this pulse actually arrives, but then the circuit changes over, the valve 2 becoming conducting, in which condition it remains until the gating pulse disappears, when the circuit reverts to its original condition with the valve 2 cut off.

It will be evident, therefore, that rectangular pulses will be obtained from the screen grid of the valve 2, which pulses are time-duration modulated. The variable leading edges of these pulses coincide with the original time-phase modulated pulses, and the fixed trailing edges coincide with the trailing edges of the gating pulses. These time-duration modulated pulses are passed through the low pass filter 12 and demodulated thereby in the usual way.

Figure 2:
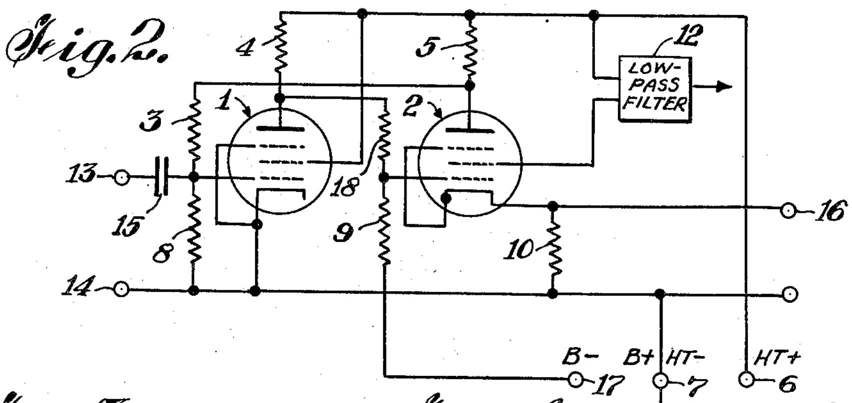
Fig. 2 shows a modification of Fig. 1.

Fig. 2 shows a slightly modified arrangement in which the majority of the elements are the same as in Fig. 1, and are given the same designations. The principal difference is that a negative biassing source is provided for the control grid of the valve 2 intended to have its positive terminal connected to the earth terminal 7 and its negative terminal to a new terminal 17 to which the grid resistance 9 is connected instead of to earth as in Fig. 1. The resistance 11 will in this case not be required. A new resistance 18 is connected between the anode of valve 1 and the control grid of valve 2. Such a resistance could have been used in the circuit of Fig. 1 if desired. The voltage of the bias source connected between terminals 7 and 17 may be large, for example it may be comparable with the high tension anode voltage. This enables resistance to be very large, and the arrangement has a better gain than that of Fig. 1.

In the ordinary way, when pulses are applied to an amplifier or other circuit through a coupling network consisting of a blocking condenser such as 15 and a shunt resistance such as 8, the voltage pulses obtained across the resistance differ in form from the applied pulses because of the charge which remains in the condenser after the disappearance of each pulse.

Figures 3, 4, 5:
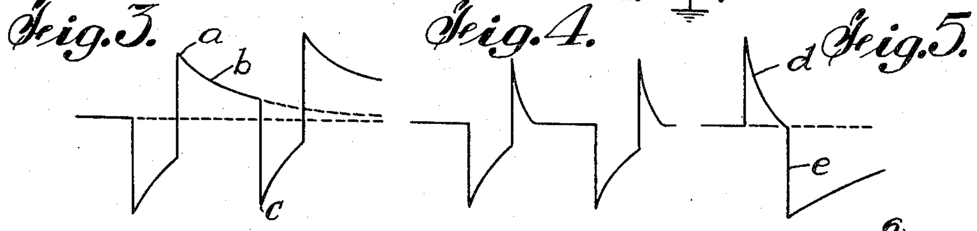
Figs. 3, 4 and 5 show diagrams of pulses used in the explanation of the invention.

Thus referring to Fig. 3, if a series of rectangular pulses are applied to the terminals 13 and 14 of Fig. 1 or Fig. 2, the condenser will be charged by the leading edge of the first applied pulse (which is assumed to be negative) and then partially discharges, so that on the disappearance of the applied pulse, the potential of the upper end of the resistance 8 swings positively as shown at *a* Fig. 3. The positive charge in the condenser then leaks away through the resistances 8, 3 and 5 and the positive potential falls gradually along the curve *b* at a rate depending on the time constant of the condenser and resistance. This forms a sort of tail to each of the pulses.

The potential will not have reached zero when the next pulse arrives, so that the corresponding negative voltage pulse *c* across the resistance 8 is of smaller amplitude than before. In other words, each pulse is affected by the previous pulses, and since successive pulses belong to different channels, crosstalk is produced between the channels by this effect.

The magnitude of the crosstalk depends on the time constant of the coupling circuit and on the normal time spacing between adjacent channel pulses. If the coupling circuit has a low time constant the positive swing will be large, but the rate of decay of the positive voltage will be rapid. If it has a high time constant, the positive swing will be small but the rate of decay will be very slow.

This source of cross talk is avoided in the embodiments which have just been described by means of the grid current of the valve 1 which discharges the condenser 15 rapidly in the intervals between the pulses, so that the positive tail which drags behind each voltage pulse across the resistance 8 has substantially disappeared before the arrival of the next pulse. This can be seen in Fig. 4 in which successive voltage pulses are substantially similar. The grid-cathode impedance of the valve can be regarded as acting as a low resistance discharging shunt across the resistance 8 for positive grid voltages so that the time constant of the coupling circuit becomes very small. When, however, a negative pulse arrives, the grid current ceases and the discharging shunt disappears practically for the duration of the pulse.

Figure 6:
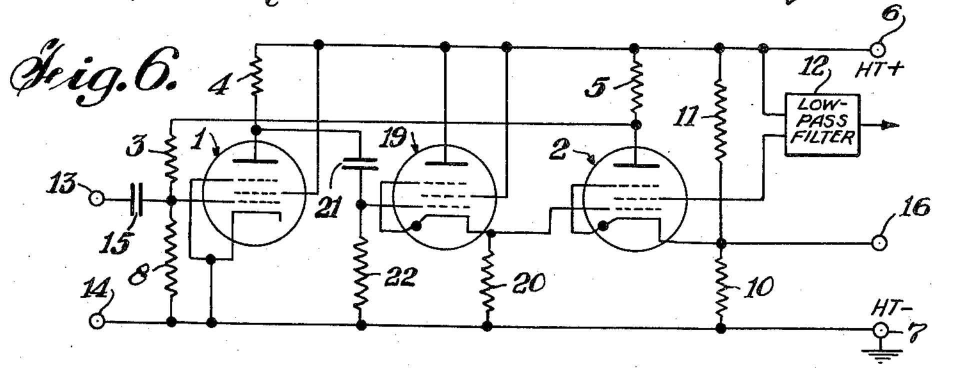
Fig. 6 shows another modification of Fig. 1.

It will be noted that in Figs. 1 and 2 the second valve 2 from which the output pulses are obtained is coupled to the first valve through a coupling network which does not include any reactances. The output pulses from the valve 1 are of positive polarity, and if the two valves were coupled through the usual resistance-capacity coupling, serious negative tails would be introduced by grid current in the valve 2. This can be understood from Fig. 5. If in the circuit of Fig. 1 or Fig. 2 positive pulses be applied to the terminal 13, the grid current would quickly discharge the condenser after its initial charge by the leading edge of the applied pulse as shown at *d* Fig. 5, and the disappearance of the pulse would then apply a large negative potential to the grid as shown at *e* and the corresponding condenser charge would then leak away slowly through the resistance 9 because there is now no grid current. This evidently produces a serious tail. As already mentioned, there can be no such tail in the arrangements of Fig. 1 and 2 since coupling between the two stages is effected without the use of a condenser. A different arrangement is however possible permitting coupling through a condenser (and thus avoiding the large biassing voltages on the second stage) by the introduction of a cathode follower valve stage in the coupling, as shown in Fig. 6, in which grid current in the cathode follower valve is prevented because the control grid must always remain slightly negative to the cathode. The arrangement has the further advantage that the cathode follower valve acts as an impedance step-down transformer. It also permits direct coupling to the output power valve without the necessity for the use of large biassing potentials.

In Fig. 6, the valves 1 and 2 are coupled through a third valve 19 (which can be a triode, tetrode or pentode) arranged as a cathode follower. This type of multivibrator circuit is more fully described in the specification of the co-pending U. S. Application Serial No. 602,450. The cathode resistance 20 of the valve 19 serves in the place of the grid resistance 9 of Fig. 1, and the control grid is connected to the anode of the valve 1 through a blocking condenser 21 and to earth through a grid resistance 22. The screen grid of the valve 19 is connected directly to the positive high tension terminal 6. All other elements in Fig. 6 are similar to those of Fig. 1 and are similarly designated.

The coupling through the valve 19 between the valves 1 and 2 introduces no change of phase and the circuit operates in substantially the same way as Fig. 1 except that the cathode follower stage produces a larger power for driving the valve 2 as explained in the above quoted specification. The time constant of the elements 21 and 22 should be as high as possible. The resistance 20 may be of the order of one tenth or one twentieth of the resistance 22, but should be large enough to prevent any grid current from flowing in the valve 19 in all circumstances, so that tails due to grid current will not be formed at this point. This arrangement enables a much smaller cathode bias to be used for the valve 2 than in Figs. 1 or 2.

The cross-talk between adjacent pulses will be substantially eliminated by the grid current in valve 1 exactly in the same way as in Figs. 1 and 2.

In the specification of co-pending U. S. application Serial No. 627,947 now Patent No. 2,454,815, complex multivibrators are described, which are similar to Fig. 6 except that the valve 2 is replaced by a number of similar output valves, of which all the anodes and control grids are connected respectively together. Each output valve has its own individual demodulating filter 12, and its own terminal 16 and resistance 10 for applying gating pulses to the cathode. Such complex multivibrators are used for separating and demodulating the individual channel pulse trains in a multi-channel pulse communication system, and each of the output valves is biased so as to be non-conducting except when one of the channel pulses corresponding to that valve arrives at the same time as a gating pulse. Thus the output valves are operated in turn one at a time by adjacent pulses which belong to different channels, so that only one of these valves is in a conducting condition at any one time. Because all the control grids are directly connected to the resistance 20 without any coupling condenser, a large grid current may be permitted in each of these output valves, and therefore a large output power can be generated, without the production of any tails to the pulses which would cause crosstalk between adjacent channel pulses appearing across the resistance 20. This is an important advantage of the present invention since it allows of a considerable reduction in the number of valves in a multi-channel system in circumstances which would otherwise result in serious crosstalk.

What is claimed is:

1. In a channel demodulating arrangement for a multi-channel electric pulse communication system, two thermionic valves the control grid of each being connected directly to the anode of the other to form a self-restoring multivibrator circuit, means for biasing the first valve so that control grid current normally flows, means applying time-phase modulated pulses in negative sense to the control grid of the first valve through a condenser-resistance coupling circuit, means for biasing the second valve so that it remains cut off during the application of the said pulses to the first valve, means for applying rectangular gating pulses corresponding to one of the channels of the system to sensitise the second valve so that it will respond only to the pulses of the said channel, said gating pulses having a duration greater than said time phase modulated pulses and having an amplitude insufficient by itself to cause said second valve to conduct, but sufficient to maintain conduction once it is initiated, and means for deriving time-duration modulated pulses from the second valve.

2. An arrangement according to claim 1 in which the gating pulses are applied in a negative sense to the cathode of the second valve.

MAURICE MOISE LEVY.

REFERENCES CITED

The following references are of record in the file of this patent:

UNITED STATES PATENTS

| Number | Name | Date |
|---|---|---|
| 2,183,399 | Heising | Dec. 12, 1939 |
| 2,266,401 | Reeves | Dec. 16, 1941 |
| 2,338,395 | Bartelink | Jan. 4, 1944 |
| 2,369,662 | DeLoraine et al. | Feb. 20, 1945 |